(12) United States Patent
Szczerba

(10) Patent No.: US 6,182,007 B1
(45) Date of Patent: Jan. 30, 2001

(54) INCORPORATING ASPECT ANGLE INTO ROUTE PLANNERS

(75) Inventor: Robert Joseph Szczerba, Endicott, NY (US)

(73) Assignee: Lockheed Martin Corp., Owego, NY (US)

(*) Notice: Under 35 U.S.C. 154(b), the term of this patent shall be extended for 0 days.

(21) Appl. No.: 09/266,643

(22) Filed: Mar. 11, 1999

(51) Int. Cl.$^7$ .................................................. G01C 21/00
(52) U.S. Cl. ........................... 701/202; 701/210; 701/122
(58) Field of Search .................................. 701/201, 202, 701/209, 210, 120, 122

(56) References Cited

U.S. PATENT DOCUMENTS

| | | | |
|---|---|---|---|
| 4,812,990 | * 3/1989 | Adams et al. | 701/3 |
| 4,947,350 | 8/1990 | Murray et al. | 364/554 |
| 5,122,801 | 6/1992 | Hughes | 342/13 |
| 5,406,286 | 4/1995 | Tran et al. | 342/13 |
| 5,504,686 | 4/1996 | Lippitt et al. | 364/444 |
| 5,526,260 | 6/1996 | Kodet et al. | 364/423 |
| 5,548,773 | 8/1996 | Kemeny et al. | 395/800 |
| 5,631,640 | 5/1997 | Deis et al. | 340/961 |
| 5,706,011 | * 1/1998 | Huss et al. | 342/65 |

FOREIGN PATENT DOCUMENTS 237 714 A1 * 9/1987 (EP).
7-12582 * 1/1995 (JP).

OTHER PUBLICATIONS

Teng et al.; Stealth terrain navigation; IEEE Systems, Man and Cbernetics; vol. 23, iss. 1; Jan.–Feb. 1993; pp. 96–110.*

Bennett; The use of digital map data for airborne operations; IEE–Serious Low Flying; Feb. 1998; pp. 2/1–2/10.*

* cited by examiner

Primary Examiner—Michael J. Zanelli
(74) Attorney, Agent, or Firm—W. H. Meise; R. P. Cogan

(57) ABSTRACT

A route planning algorithm for a vehicle takes into account the aspect angle which the vehicle presents to threats in the environment. A flag is set in each map grid cell for which intervisibility with a threat exists. For each cell in which the flag is set, an aspect angle pointer points to a mathematical function which represents the cost value function attributable to the type of vehicle, the type of threat, and the aspect angle of the path segment. A determination is made as to whether an auxiliary function representing the probability of the threat is associated with the cell under consideration, and if so the auxiliary function is evaluated. If the result of the auxiliary function is nonzero, the aspect angle function is evaluated, and added to the map cost function to form a total cost. If not, the route planning algorithm continues without taking aspect angle into account. If so, the route planner uses the total cost.

6 Claims, 5 Drawing Sheets

INCORPORATING ASPECT ANGLE INTO ROUTE PLANNERS

FIELD OF THE INVENTION

This invention relates to route planning, and more particularly to the planning of routes in the presence of aspect angle constraints.

BACKGROUND OF THE INVENTION

Route planning is an important problem for a number of applications including, but not limited to, autonomous robotics, navigation/guidance of air, naval, and ground vehicles, intelligent transportation systems, and space related applications (i.e., planetary rovers, etc.), as described, for example, in Y. Hwang et al., Gross Motion Planning-a survey, *ACM Computing Surveys,* 24(3): 219, 291, September 1992; J. Latombe *Robot Motion Planning,* Kluwer, Boston, Mass. 1991; and R. Szczerba, *New Cell Decomposition Techniques for Planning Optimal Paths,* Doctoral Dissertation, University of Notre Dame, Notre Dame, Ind., 1996. Various applications require routes to have certain characteristics, parameters, and constraints depending on the application, or on the specific type of vehicle platform (aircraft, ship, tank, etc.).

When devising route planners, there are a number of desiderata which should be met to the extent possible, among which are real-time determination of relative costs for different types of vehicles in the presence of various types of environments. The result should be accurate, and should not rely on unrealistic approximations. The environment may be time-varying in nature, and may possibly even be represented by some sort of probability function (if exact locations are not known with a high degree of certainty). Furthermore, any such approach should be able to adapt, in real-time, to changing environmental conditions, given sufficient computing power.

Optimal solutions to the general case of route planning with the above-described constraints are considered to be NP-Complete in nature (corresponding to a particular class of problems in which no polynomial time solution is known to exist). Even if an optimal solution were to be found, which is believed to be unlikely, the convergence time and related memory requirements would likely be completely unrealistic for real-time applications using readily available processors. Thus, heuristic approaches have been used to generate efficient (based on computational and memory constraints) routes in real-time which are as good or better than a human could generate.

Most route planners for military operations are based on searching a digitized grid consisting of square cells of equal size. This technique is used because available terrain data generally comes from DTED (Digital Terrain Elevation Data) databases which are stored in grid-based formats. A route is then computed from a given "start" cell position to a "goal" cell position, with each cell representing a particular location in the environment. A cost estimation step is used to establish a "cost" value for a particular grid cell, corresponding to the cost incurred by an aircraft (or other vehicle) traveling through that particular region. This cost is used to represent any number of factors such as terrain features, threat exposure, weather conditions, cultural features, etc. The set of cost values for a particular environment is called its map cost (MC) array and is of size m×n, as described in C. Bodenhorn et al., Personalizing Onboard Route Re-Planning for Recon, Attack, and Special Operations Missions, 1997 *American Helicopter Society Conference (Avionics and Crew Systems Technical Specialists Conference),* September 1997; P. N. Stiles et al., Highly Parallelizable Route Planner based on Cellular Automata Algorithms, *IBM Journal of Research and Development* 38(2):167–181, March 1994; R. Szczerba et al., A Mission Adaptable Route Planner for Intelligent Guidance/Navigation Systems, 36th *AIAA Conference (Aerospace Sciences Meeting and Exhibit),* January 1998. A number of different route planning techniques use variations of such a cost array as input to compute the desired route. There are a very large number of different route planning techniques. A survey of various route planning algorithms, architectures, and techniques can be found in the Y. Hwang et al. and J. Latombe references.

Most route planners that use grid-based representations of the environment compare or correlate a proposed path segment in the form of a line overlayed on the square grid cell environment, to determine which grid cells the line intersects. A function is provided that adds up the relative cell costs (MC values) along cells lying on the particular segment of the route that is being considered in the route search process. The MC values of these cells are then added up and compared to the costs of other route segments being considered. FIG. 1 represents a portion of a simple grid-based map 10, showing the map cost for each cell or grid element. In FIG. 1, the cells are in a grid including five rows A, B, C, D, and E, and five columns 1, 2, 3, 4, and 5. All cells in row A have map values or costs of 34, and all cells in row B, except cell B5, have map costs of 34. Cell B5 has a map cost of 12. In row C, cells C1 and C2 each have a cost of 34, cell C3 has a cost of 88, C4 has cost 10, and C5 cost 23. In row D, the costs for columns 1, 2, 3, 4, and 5 are 34, 54, 33, 33, and 45, respectively. In row E, each cell has a map cost of 12. In FIG. 1, a line segment or path 12 represents a segment of a route. Line segment 12 intersects cells D1, D2, C2, C3, and C4. The cost of route segment 12 is determined by summing the map costs of cells D1, D2, C2, C3, and C4, which in the example is the sum of 34+54+34+88+10=220. In some cases, it may be desirable to average the cost per unit cell of the path traversed by the path segment, in order to more accurately assess the relative costs of equal-length path segments which happen to traverse different numbers of cells because of the differing directions of the path segments. A complete minimum-cost route is then generated by connecting various route segments which provide the least sum of map cost values.

The MC values of the grid cells of a grid map are usually computed off-line, taking into account data from a number of different sources. In determining the map cost, the cost of terrain features, threat exposure, cultural features (man-made features), etc. are all weighted and added together to generate the single cost value for each grid cell.

SUMMARY OF THE INVENTION

A method according to an aspect of the invention for planning a route includes the step of storing information pertaining to the environment, including the locations of threats, as map cost values in a grid-based map. A region of intervisibility is determined for each threat. A route is determined or planned through the environment by summing map cost values for each grid cell through which the vehicle may travel, and, only within the region of intervisibility, aspect-angle cost values are summed with the map cost values.

DESCRIPTION OF THE INVENTION

Figures 1, 2:
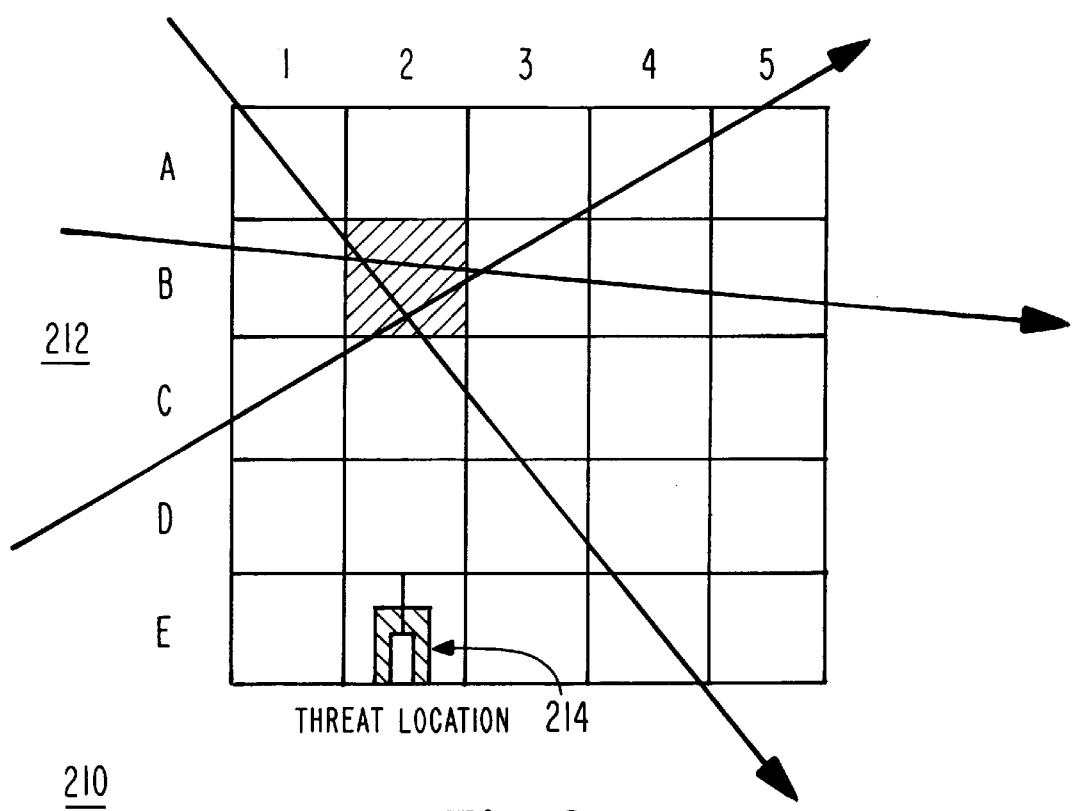
FIG. 1 is a simplified representation of a grid-based map, showing map cost values for each cell of the grid, and a straight-line route segment extending through some cells.
FIG. 2 is a simplified representation of a grid-based map, illustrating several possible route portions extending through a cell.

One important factor in determining the desirability of a particular route is that of a vehicle's aspect angle to perceived "threats". Some vehicles are much more visible to certain sensors at certain aspect angles, and hence are more vulnerable to countermeasures when presenting those angles to the threat. This concept is important for both military as well as commercial applications. For military applications, a battlefield environment may be scattered with threats, of varying degrees of lethality, which must be avoided, or to which exposure should be limited, to achieve certain mission objectives. In such cases, the aspect angle is the orientation of a vehicle in relation to these battlefield threats. Depending on the orientation of the vehicle at a given point in time, the probability of detection by that threat may increase or decrease. For commercial applications, the concept of aspect angle can relate to minimizing the noise of an aircraft as is passes near a populated area. In many cases, the noise level is a function of the orientation of the aircraft as it moves through or around urban areas. The concept of aspect angle is important for a number of space-related applications as well. Most planetary rovers have solar panels which are used to recharge an internal battery. One would certainly want to plan routes which maximizes exposure to the sun and minimizes time in shadows, while maintaining the solar panel's aspect angle to the illumination source. In the area of autonomous robotics, navigation is often required near sources of intense radiation. Desirable routes would position the robot in such a way that the most sensitive robotic components are the least exposed to the radiation. Other military and commercial applications of route planning incorporating aspect angle will be apparent to those skilled in the art.

When incorporating the concept of aspect angle into a route planner, there are additional desiderata which should be met to the extent possible, among which are real-time determination of relative costs for different vehicle aspect angles. The area(s) or region(s) of interest, for which the aspect angle is being computed, may also be time-varying in nature and, as with other aspects of the environment, may possibly even be represented by some sort of probability function (if the exact location of the threat's location or the region of interest is not known with a high degree of certainty).

Finding an algorithm to solve this type of route planning problem, having numerous optimality constraints and parameters, and with the addition of aspect angle considerations, is very difficult.

The problem with application of aspect angle to grid-based map approaches to route planning is that the cost of a particular cell cannot be computed off-line if that cost is dependent on parameters which are not known until the actual running of the search algorithm. For example, cell costs based on terrain features can be computed off-line since digital terrain information about the environment is available a priori and doesn't normally depend on the direction of movement through a cell.

One possible approach to route planning, taking into account aspect angle, involves adding various aspect angle cost values to each grid cell. FIG. 2 illustrates a portion of a grid-based map 210 similar to map 10 of FIG. 1. In FIG. 2, the map cost values are deleted for simplicity. As illustrated, a set 212 of three different paths 212a, 212b, and 212c extend in different directions through cell B2. Cell E2 contains a threat illustrated as a block 214. Most vehicles are incapable of "crabwise" movement which can maintain a particular part of the vehicle presented to a threat regardless of direction of motion. Put another way, most types of vehicles have a preferred direction of motion, and motion in that direction along different paths, such as the various paths of set 212 of paths, inevitably changes the aspect angle presented to a threat at a fixed location on the map, such as threat 214 of FIG. 2.

One way to approach the aspect-angle aspect of the problem is to assign multiple cost values off-line to each grid cell, corresponding to different possible angles of movement through a particular cell. Since the map may be used by many friendly vehicles, the stored aspect angle must include information relating to the aspect angle characteristics of each type of vehicle with which the map might be used. Furthermore, since each type of friendly vehicle is subject to various types of threats, each cell must contain information relating each aspect angle for each type of friendly vehicle to each possible threat. In using this approach, countervailing factors must be considered. In order to keep the amount of information stored in each cell to a minimum, the aspect angles should be quantized into ranges. However, such quantization reduces the angular resolution. If the angular resolution is too small (corresponding to how many separate angles need to be saved for each cell), the amount of memory needed quickly grows beyond the bounds of real systems. If the number of angles saved is relatively small (e.g., 4 quadrants, or 8 octants) then the accuracy of the cost value is significantly reduced and the overall safety of the route is compromised. Storing the aspect angle information in association with each cell has another disadvantage, in that, during the route planning process, it would be quite difficult to change the cost values for a particular threat. In other words, if the nature of a particular piece of equipment (friendly or threat) changes as a result of updated information, every aspect angle stored in every grid cell must be changed. Furthermore, the actual threat region may not be accurately known a priori and may be time-dependent or based on some sort of probability function. There is no way to handle such a case with the map-cell based approach.

Figure 3:
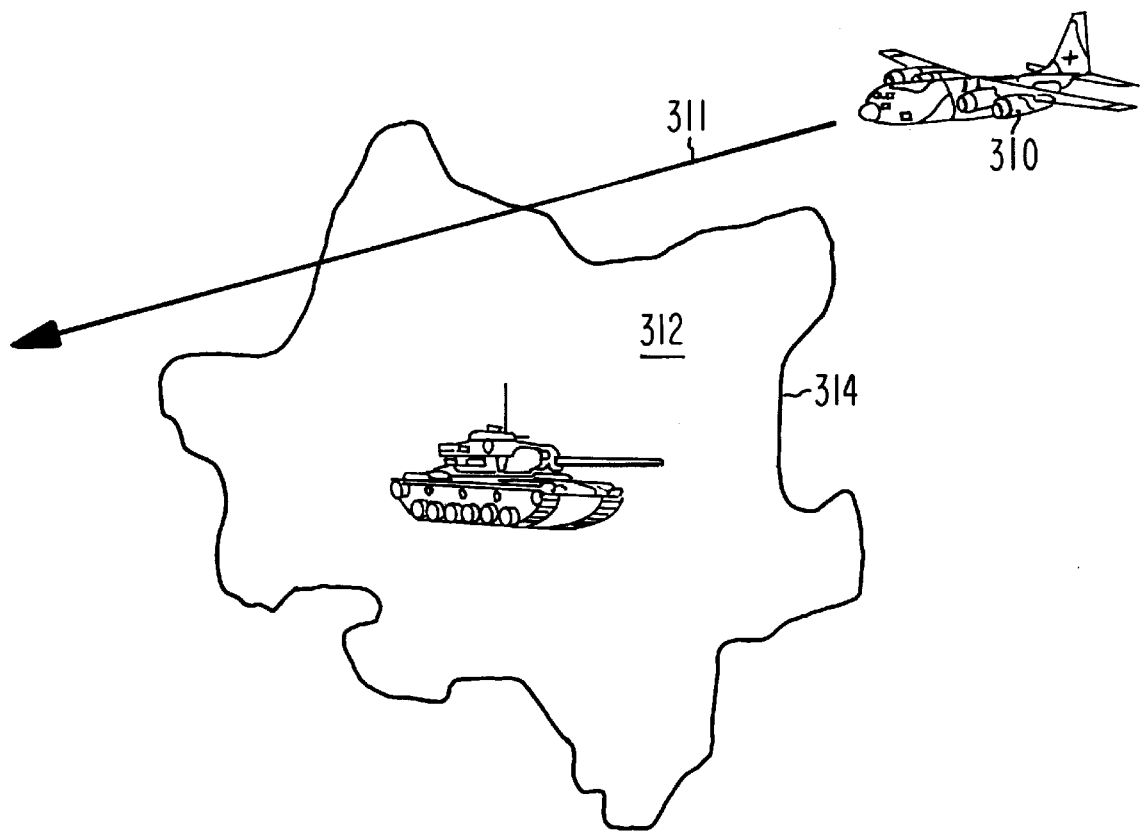
FIG. 3 is a simplified representation of a vehicle moving through a region of intervisibility of a threat.

According to an aspect, avatar, embodiment, incarnation, hypostasis, motif, or objectification of the invention, the aspect angle costs are separated from the cells of the grid map for route planning purposes. These costs are computed off-line through the use of cost functions, which are stored in memory separate from the grid cells. This alone has the advantage of avoiding the storage of data redundantly in all of the grid cells. In general, this allows a single memory to be used for the aspect angle information, rather than duplicating much of the aspect angle information in each of the grid cells, which is a major advantage. The aspect-angle information is incorporated into the route planning process in real-time. For most military applications, the aspect angle is computed based on visibility from enemy threat locations, known as a threat's region of intervisibility (IV). FIG. 3 shows a possible route 311 of a fixed-wing aircraft 310 through the region of intervisibility 312, represented by the area or region enclosed by border 314. Outside of the area 312, the aspect angle is irrelevant, because there is no threat which can "see" the vehicle. Thus, the region of intervisibility is the only region in which the aspect angle must be considered. Within the region of intervisibility, the possible extra cost of aspect angle is considered in determining the true cost of traversing the region. Depending on the type of sensors a threat may possess, different orientations of the aircraft may make the aircraft more or less likely to be detected. For example, a threat using radar at an aspect angle towards the front of the aircraft would be less likely to detect the aircraft than if the aspect angle were from the side, due to the greater surface area on the side of the plane.

It should be noted that the term "intervisibility" is a standard term of art in the field of route planning, but the term itself may be interpreted as suggesting that two-way visibility is required; in the context of this invention, "intervisibilty" is taken to require only one-way visibility. Further problems arise due to the fact that a threat's region of intervisibility may be dynamic in nature (changing in shape and location as a function of time). The threat intervisibility region may not even be accurately known, but just probabilistically known (i.e., there is a certain probability that the shape of the region will be of a certain size or orientation, possibly depending on time of day, weather conditions, etc.). All these factors need to be taken into account. Taken as a whole, the incorporation of aspect angle into route determinations is quite a difficult problem. The technique according to the invention is conceptually simple in nature, but powerful enough to accurately and efficiently solve this particular problem.

Figure 4:
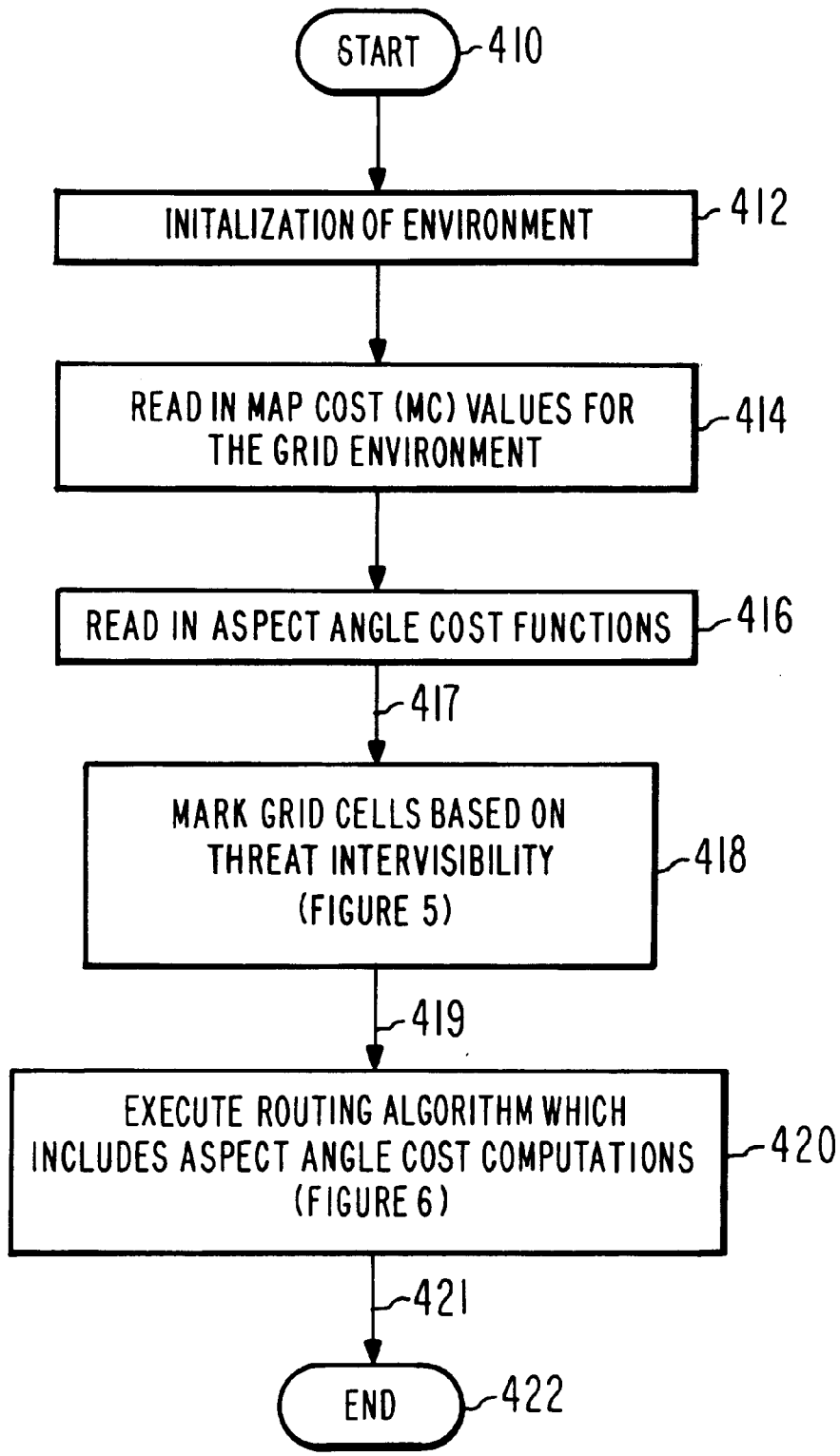
FIG. 4 is a simplified flow chart or flow diagram illustrating the overall operation of a route planning algorithm in accordance with an aspect of the invention.

FIG. 4 is a simplified flow chart illustrating the overall method according to the invention. In FIG. 4, the logic begins at a START block 410, and proceeds to a further block 412, which represents the initialization of present location on the grid map and the ending location, and also includes all applicable constraints, such as turning constraints, weapon and sensor ranges, and the like. From block 412, the logic flows to a block 414, which reads the map cost values. Block 416 represents the reading of the functions which determine aspect angle cost, together with the weapon andor sensor characteristics of the various types of threats which may be encountered. From block 416, the logic flows by a logic path 417 to a further block 418, which represents the identification of those cells in which a threat may be located or from which the vehicle can be seen by the threat. This block may involve the probability that a threat is present in the various cells as a function of time, the estimated intervisibility, and the like. A flag is set for each cell which may contain a threat or from which the vehicle can be seen by the threat. The result of block 418 associates a pointer with each cell within the threat region, which corresponds to the cells associated with flags. This pointer points to a stored aspect angle function. Block 420 represents the execution of the route planning algorithm on the stored map cost values summed with the result of executing the aspect angle function. The route planning algorithm may be of any conventional type. Once the route is planned, the logic reaches an END block 422.

Figure 5:
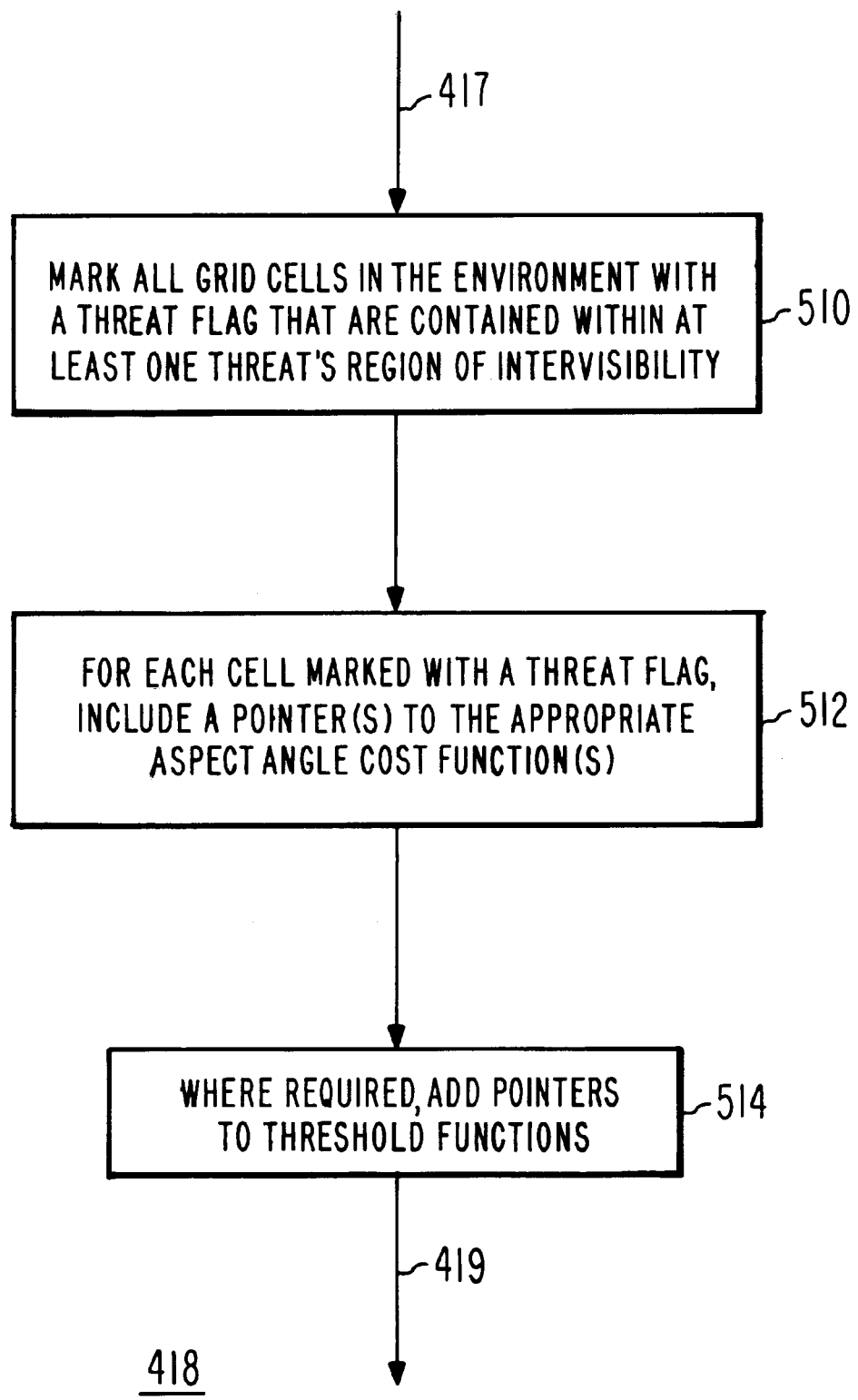
FIGS. 5 and 6 are simplified flow charts illustrating details of the flow chart of FIG. 4.

FIG. 5 is a simplified flow chart which illustrates details of block 418. In FIG. 5, the logic arrives by way of logic path 417 at a block 510. Block 510 sets a threat flag in each cell in which the probability of the existence of a threat exceeds a predetermined threshold. It also adds a first set of aspect angle pointers, one for each threat which has been identified as having intervisibility into that particular grid cell. This pointer or pointers point to stored cost functions which allow for the computation of aspect angle for a unique pair of own-ship vehicle and threat type. These functions are determined experimentally, and take into consideration such factors as distance of the target from threat, aspect angle of the target to the threat, weather conditions, and the like, and returns a cost value. The experimental procedures may involve illuminating models of the various target vehicles with radar or other signals, and noting the characteristics of the reflected energy at various aspect angles. In this context, the aspect angle may have pitch, roll and yaw components, and so is a three-dimensional quantity.

From block 510 of FIG. 5, the logic then flows to a block 514, which may add a second set of pointers to those cells having the threat flag set. The second set of pointers is for those situations in which the presence of the threat is determined by probabilistic factors which can be expressed by a mathematical function. These probabilistic constraints may include time, temperature, cloudiness, rain, etc. For example, if a threat is expected to be in the cell only between certain hours of the day, this expectation is accounted for by a pointer which is added in block 514. Similarly, if the threat occurs only within a certain temperature range, the pointer points to a function which evaluates the current temperature, and generates a threat cost value which is either zero or nonzero, depending upon the temperature. From block 514, the logic returns by logic path 419 to block 420 of FIG. 4.

Figure 6:
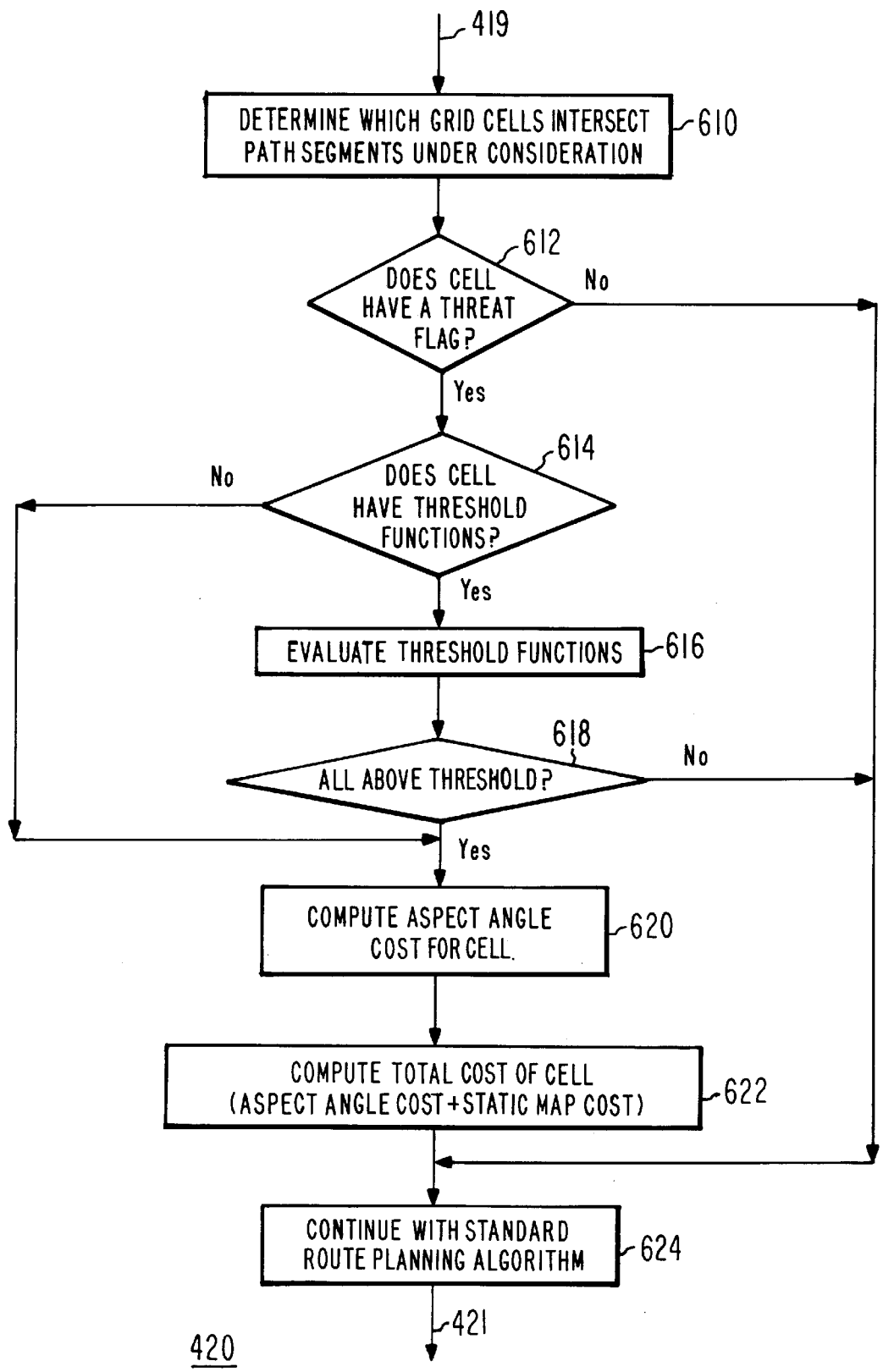

FIG. 6 is a simplified flow chart or diagram illustrating details of route planning block 420 of FIG. 4. In FIG. 6, the logic reaches block 610 from logic path 419. Block 610 represents determination of each map cell which is traversed by the current path segment being considered in the search process, in accordance with the route planner algorithm. For each cell being traversed, the logic flows to a decision block 612. Decision block 612 determines whether the current cell has an associated threat flag. If not, the logic leaves decision block 612 by the NO output, and arrives at a block 624, which represents continuation of the normal function of the routing algorithm. If the threat flag is set, then we know that an aspect angle pointer exists, and the logic leaves decision block 612 by the YES output, and arrives at a further decision block 614. Decision block 614 examines the map cell being considered for the presence of associated threshold functions. If there are no associated threshold functions, the logic leaves decision block 614 by the NO output, and arrives at a block 620. If there are threshold functions associated with the map cell currently being evaluated, the logic leaves decision block 614 by the YES output, and arrives at a block 616. Block 616 represents evaluation of the threshold functions, as for example evaluation of a temperature-dependent function in view of the current temperature. From block 616, the logic flows to a decision block 618, which determines if aspect angle must be considered for the cell under consideration, or in other words if the result of block 616 is nonzero. If the result of the evaluation in block 616 is zero, then aspect angle does not have to be evaluated, the logic leaves decision block 618 by the NO output, and goes on to block 624, the remaining portion of the route planning algorithm. On the other hand, if the result of block 616 is nonzero, the logic leaves decision block 618 by the YES output, and arrives at a block 620. Block 620 represents computation of the aspect angle costs of traversing the cell currently under evaluation at the angle of the path segment, and for the threats found to be in place. From block 620, the logic flows to a block 622, which represents adding the result of the "dynamic" aspect angle costs determined in block 620 to the "static" map cell cost value associated with the cell currently being considered, to thereby produce a total cost. From block 622, the logic flows to block 624, representing the remaining portion of the route planning algorithm. Thus, the route planning algorithm uses for its determinations either the static map cost or the total cost (total cost equals static plus dynamic cost), depending upon the presence or absence of an aspect-angle-dependent component of the cost.

Other embodiments of the invention will be apparent to those skilled in the art. For example, block 618 of FIG. 6 has been described as directing the logic to the NO output if the function is zero, but a threshold can be set so that small auxiliary function cost values also result in directing the logic around the aspect angle calculations.

What is claimed is:

1. A computer method for determining a vehicle path toward a goal location, said method comprising the steps of:

precomputing a quantized data representation of the environment, including an array of cells or elements defining a coordinate system, said quantized data representation including information relating the terrain, the location of said vehicle in said environment, probable locations of threats, and probable characteristics of said threats, said quantized data representation also including, for each cell or element of said quantized data representation, information relating to the costs associated with traversing the cell or element at a particular aspect angle relative to said coordinate system;

determining a goal location;

plotting a path though said environment using both said quantized data representation and dynamically determined aspect angle information.

2. A computer method for determining a vehicle path toward a goal location, said method comprising the steps of:

obtaining a quantized data representation of the environment quantized into cells or elements, said quantized data representation of the environment including information relating the terrain, the location of said vehicle in said environment, probable locations of threats, and probable characteristics of said threats, said quantized data representation including, for each cell or element of said quantized data representation, information relating to static costs associated with information about the environment which can be determined regardless of aspect angle of said vehicle relative to said threats;

obtaining information relating to the characteristics of said vehicle as a function of both aspect angle and threat;

determining a goal location;

plotting a path though said environment using (a) said precomputed static cost representation in conjunction with (b) a function including said information relating to the characteristics of said vehicle as a function of both said aspect angle and said threat.

3. A method according to claim 2, wherein said function includes a factor depending upon the distance of said threat.

4. A method for planning a route for a vehicle, said method comprising the steps of:

storing information pertaining to the environment as map cost values in a grid-based array of map cells, said information including the locations and characteristics of threats;

determining a region of intervisibility for each threat; and determining a route through said environment by summing map cost values;

storing aspect-angle cost values associated with the type of threat, the type of vehicle, and the aspect angle between said threat and said vehicle; and only within said region of intervisibility, summing said aspect-angle cost values with said map cost values.

5. A method according to claim 4, wherein said step of summing aspect-angle cost values includes the further steps of:

setting a flag associated with each map cell for those situations in which intervisibility with a threat exists;

for each map cell in which a flag is set, adding a pointer which point to the aspect angle cost value which defines the threat associated with the vehicle for which the route is being planned, the threat, and the path segment being considered; and evaluating said aspect angle cost value to determine said aspect angle cost values.

6. A method according to claim 5, further comprising the step of:

for each map cell in which a flag is set, adding an aspect angle threshold function which determines if the aspect angle must be considered for the cell under consideration; and between said steps of adding a pointer and evaluating said aspect angle function, performing the further steps of:

determining the presence or absence of a threshold function in association with a cell under consideration;

if a threshold function is associated with the cell under consideration, evaluating said threshold function to produce a threshold function cost value;

if said threshold function cost value is less than the value of said aspect angle threshold function, bypassing said step of evaluating said aspect angle function to determine said aspect angle cost values, and using said map cost value in place of said total cost value.

* * * * *